United States Patent Office 3,560,597
Patented Feb. 2, 1971

3,560,597
PROCESS FOR PREPARING DIALKYL THIOPHOSPHITES
Donald N. Bernhart and Daniel F. Simmons, Mount Pleasant, Tenn., assignors to Stauffer Chemical Company, New York, N.Y.
No Drawing. Filed Nov. 7, 1968, Ser. No. 774,167
Int. Cl. C07f 9/16
U.S. Cl. 260—981  6 Claims

ABSTRACT OF THE DISCLOSURE

A process for the preparation of dialkyl thiophosphites by the reaction of $P_4S_7$ and an alcohol in a molar ratio of at least about 1 to 8 and recovering the product by treating the reaction mixture with water having a temperature of less than about 40° C. in an amount sufficient to contain the water soluble impurities, separating the aqueous phase from the organic phase and distilling the organic phase to recover the dialkyl thiophosphite.

---

This invention relates to a process for preparing dialkyl thiophosphites, and more particularly, to a process for preparing dialkyl thiophosphites by the reaction of phosphorous heptasulfide with an alcohol of from one to eight carbon atoms.

Dialkyl thiophosphites, also known as dialkyl phosphorothioites, are useful in making many commercial pesticides. For example, a thiophosphite is reacted with chlorine or other chlorinating agent, such as a sulfur chloride, and then the resultant chloro compound is reacted with a compound containing an active hydrogen, such as a phenol or its sodium salt. One well known insecticide, Parathion, is made by this procedure. Its chemical name is O,O-diethyl, O-p-nitrophenyl phosphorothioate. The dialkyl thiophosphites have not been extensively commercialized, however, as have the corresponding oxy analogs, i.e., the dialkyl phosphites, for the reason that the thiophosphites have been difficult to prepare. For example, the principal method known to applicants for preparing thiophosphites is represented by the following reaction diagrams:

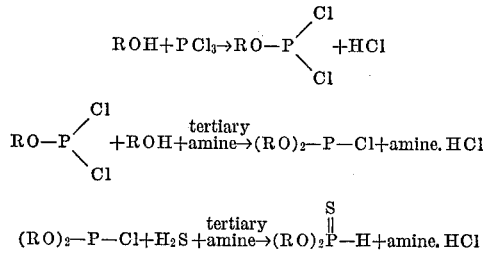

wherein R is an alkyl of from one to eight carbon atoms. By this prior art three step process, however, the products can be recovered only with considerable expense and difficulty.

It has been attempted to prepare dialkyl thiophosphites by reacting phosphorus heptasulfide with an alcohol, but this method proved unsuccessful by reason of very low yields. (47 Chem. Abstr. 9909, 1953.)

It has now been discovered that dialkyl thiophosphites can be produced in good yield by reacting phosphorus heptasulfide and an alcohol in a molar ratio of at least about 1 to 8 at a temperature between about 0° C. and reflux temperature and recovering the thiophosphite product by treating the reaction mixture with water in an amount sufficient to contain the water soluble impurities, said water having a temperature less than about 40° C. separating the aqueous phase from the organic phase, and distilling the organic phase to recover the dialkyl thiophosphite.

It is preferable to use phosphorus heptasulfide ($P_4S_7$), which is relatively pure, but some product can be obtained by using phosphorus pentasulfide ($P_2S_5$), or commercial phosphorus pentasulfide ($P_4S_{10}$) which may contain from a minor to a major amount of phosphorus heptasulfide. Preferably, the reaction is conducted at a temperature between about 25° C. and about 55° C. for a period of between about 1 and 10 hours. The reaction can be conveniently conducted at atmospheric pressure. It is preferred that an excess of at least about 5 to 10% alcohol be employed in order to allow for any loss of alcohol due to evaporation. No solvents are required if the alcohol addition is carefully controlled. Inasmuch as the reaction is exothermic, however, it is preferred that the phosphorus heptasulfide be slurried in some thiophosphite product which serves as a carrier or solvent. Any low boiling petroleum solvent can be employed, such as hexane petroleum ether or chloroform. The temperature can be easily controlled by careful addition of the alcohol reactant.

Any order of addition can be employed, but it is preferred that the phosphorus heptasulfide first be added to a carrier or solvent, such as dialkyl thiophosphite product, and then the alcohol added. After the reaction is complete, the reaction mixture should be first washed with water, maintained at a temperature less than about 40° C. and preferably between about 0° C. and about 30° C. in order to separate the organic phase. If the water temperature is allowed to rise above 40° C. a substantial proportion of the thiophosphite will be hydrolyzed to the free acid. The thiophosphite product is then recovered from the organic phase by distillation. It is not desirable to distill the reaction mixture prior to the water treatment, as this causes the hydrolyzable and water soluble impurities, such as the dialkyl thio acid

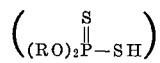

to decompose making separation of the desired product difficult and expensive. In order to prevent the hydrolysis or decomposition of the dialkyl thiophosphite product, the water used to separate the hydrolyzable impurities should have a neutral pH. Although it may be possible to employ water having a slightly basic pH, such as a buffered aqueous solution employing sodium acetate or other weak base; or even a weakly acidic aqueous solution, there is no advantage in doing so, and a strong basic solution will destroy the product.

The following examples will serve to illustrate the invention and its preferred embodiments.

EXAMPLE 1

To a 500 ml. round bottom flask equipped with a thermometer and magnetic stirrer, was added 87 grams of phosphorus heptasulfide ($P_4S_7$). To the flask was then slowly added 100 grams of ethanol with continuous agitation while maintaining the temperature of the reaction mixture between 55° C. and 60° C. After the ethanol addition was complete, the reaction mixture was maintained within the aforesaid temperature range for an additional hour. The reaction was discontinued and some solid material was noted. 150 grams of water was added to the flask and the mixture stirred for one hour. The reaction mixture was then placed in a separatory funnel and the mixture was allowed to settle into two layers. The lower organic layer was separated and placed in a 250 ml. distillation flask. The volatiles were removed by distillation at from 2 to 3 mm. of Hg pressure. 98.6 grams (65% yield) of diethylthiophosphite having a purity of 98.5% was recovered and identified by instrumental analysis.

EXAMPLE 2

In accordance with the procedure of Example 1, the example was repeated but for the exception that the ethanol addition was made at a temperature of 90° C. 73 grams (45% yield) of diethylthiophosphite was recovered.

EXAMPLE 3

In accordance with the procedure of Example 1, 87 grams of phosphorus heptasulfide and 70 grams of methanol were reacted. 82.5 grams of product was recovered which was identified by instrumental analysis as dimethylthiophosphite of 97.6% purity.

EXAMPLE 4

The procedure of Example 3 was repeated but for the exception that the methanol addition was made at a temperature of from 85 to 90° C. 63 grams of product was recovered which was identified by instrumental analysis as dimethylthiophosphite.

EXAMPLE 5

In accordance with the procedure of Example 1, 87 grams of phosphorus heptasulfide and 130 grams of normal propanol were reacted. 108 grams of product was recovered which was identified by instrumental analysis as dipropylthiophosphite of 96.7% purity.

EXAMPLE 6

In accordance with the procedure of Example 1, 87 grams of phosphorus heptasulfide and 130 grams of normal propanol were reacted at a temperature of from 85 to 90° C. 71 grams of product was recovered which was identified as di-n-propylthiophosphite.

What is claimed is:

1. The process for preparing dialkyl thiophosphites which comprises reacting phosphorus heptasulfide and an alcohol of from one to eight carbon atoms, in a molar ratio of at least about 1 to 8, at a temperature of between about 0° C. and reflex temperature, for a time sufficient to effect reaction; treating the reaction mixture with water having a temperature of less than about 40° C. in an amount sufficient to contain the water soluble impurities, separating the aqueous phase from the organic phase and distilling the organic phase to recover the dialkyl thiophosphite.

2. The process of claim 1 wherein the reaction is conducted at a temperature between about 25° C. and about 55° C.

3. The process of claim 1 wherein the temperature of the water is between about 0° C. and about 30° C.

4. The process of claim 1 wherein the alcohol is present in excess of stoichiometric requirements of at least about 5% to about 10%.

5. The process of claim 1 wherein the phosphorus heptasulfide is slurried in a solvent.

6. The process of claim 5 wherein the carrier is dialkyl thiophosphite product.

References Cited

UNITED STATES PATENTS 3,274,300   9/1966   Van Wazer et al. _____ 260—981

OTHER REFERENCES

Kabachnik et al.: Chemical Abstracts, vol. 47, p. 9909 (1953).

CHARLES B. PARKER, Primary Examiner

R. L. RAYMOND, Assistant Examiner

U.S. Cl. X.R.

260—990